US007764961B2

(12) United States Patent
Zhu et al.

(10) Patent No.: US 7,764,961 B2
(45) Date of Patent: Jul. 27, 2010

(54) MOBILE BASED AREA EVENT HANDLING WHEN CURRENTLY VISITED NETWORK DOES NOT COVER AREA

(75) Inventors: Yinjun Zhu, Sammamish, WA (US); John Gordon Hines, Kirkland, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 12/585,104

(22) Filed: Sep. 3, 2009

(65) Prior Publication Data

US 2010/0003976 A1  Jan. 7, 2010

Related U.S. Application Data

(60) Continuation of application No. 11/399,528, filed on Apr. 7, 2006, now abandoned, which is a continuation of application No. 10/459,448, filed on Jun. 12, 2003, now abandoned, application No. 12/585,104, which is a continuation-in-part of application No. 12/007,948, filed on Jan. 17, 2008, and a continuation-in-part of application No. 11/360,579, filed on Feb. 4, 2006, which is a continuation of application No. 10/318,171, which is a division of application No. 10/318,171, filed on Dec. 13, 2002, now Pat. No. 7,321,773.

(51) Int. Cl.
*H04W 4/00* (2009.01)
(52) U.S. Cl. .................. 455/433; 455/414.1; 455/432.1; 455/435.1; 370/328; 370/338
(58) Field of Classification Search .................. 455/433, 455/414.1, 432.1, 435.1
See application file for complete search history.

(56) References Cited

U.S. PATENT DOCUMENTS 1,103,073 A  7/1914  O'Connel (Continued)

FOREIGN PATENT DOCUMENTS

WO  WO01/45342  6/2001

(Continued)

OTHER PUBLICATIONS

Yilin Ahao, Efficient and reliable date transmission for cellular and GPS based mayday systems, Nov. 1997, IEEE, IEEE Conference on Intelligent Transportation System, 1997. ITSC 97, 555-559.

(Continued)

*Primary Examiner*—Nghi H Ly
(74) *Attorney, Agent, or Firm*—William H. Bollman

(57) ABSTRACT

An area event handler informs when a target mobile enters or leaves a network covering a pre-defined target area, and re-aims an original area event request. When the event occurs, the mobile sends a location report to an initiator of the request. A PLMN list with estimated geographic coverage areas is stored in a Home GMLC, and sent to each relevant mobile. When a mobile enters new network coverage, it uses this list for network access selection. When the Home GMLC discovers that the currently visited PLMN does not serve the original target area, it modifies the area event to the that mobile, so that the Home GMLC will be notified when the target mobile once again enters a PLMN that serves the original target area. Then, after being so notified, the Home GMLC re-sends the original area event location service request to the target mobile.

22 Claims, 7 Drawing Sheets

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,144,283 A | 9/1992 | Arens et al. |
| 5,161,180 A | 11/1992 | Chavous |
| 5,166,972 A | 11/1992 | Smith |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,235,630 A | 8/1993 | Moodey et al. |
| 5,239,570 A | 8/1993 | Koster et al. |
| 5,266,944 A | 11/1993 | Carroll et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergreen et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fuchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,604,486 A | 2/1997 | Lauro et al. |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarak et al. |
| 5,628,051 A | 5/1997 | Salin |
| 5,633,912 A | 5/1997 | Tsoi |
| 5,682,600 A | 10/1997 | Salin |
| 5,740,534 A | 4/1998 | Ayerst et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vanttila et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,822,700 A | 10/1998 | Hult et al. |
| 5,828,740 A | 10/1998 | Khuc et al. |
| 5,920,821 A | 7/1999 | Seazholtz et al. |
| 5,930,701 A | 7/1999 | Skog |
| 5,943,399 A | 8/1999 | Bannister et al. |
| 5,946,629 A | 8/1999 | Sawyer et al. |
| 5,946,630 A | 8/1999 | Willars et al. |
| 5,950,130 A | 9/1999 | Coursey |
| 5,953,398 A | 9/1999 | Hill |
| 5,974,054 A | 10/1999 | Couts et al. |
| 5,978,685 A | 11/1999 | Laiho |
| 5,987,323 A | 11/1999 | Huotari |
| 5,999,811 A | 12/1999 | Molne |
| 6,032,051 A | 2/2000 | Hall |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,075,982 A | 6/2000 | Donovan et al. |
| 6,081,508 A | 6/2000 | West et al. |
| 6,101,378 A | 8/2000 | Barabash et al. |
| 6,122,503 A | 9/2000 | Daly |
| 6,122,520 A | 9/2000 | Want et al. |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,181,935 B1 | 1/2001 | Gossman et al. |
| 6,188,752 B1 | 2/2001 | Lesley |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,223,046 B1 | 4/2001 | Hamill-Keays et al. |
| 6,226,529 B1 | 5/2001 | Bruno et al. |
| 6,249,680 B1 | 6/2001 | Wax et al. |
| 6,249,744 B1 | 6/2001 | Morita |
| 6,266,614 B1 | 7/2001 | Alumbaugh |
| 6,278,701 B1 | 8/2001 | Ayyagari |
| 6,289,373 B1 | 9/2001 | Dezonno |
| 6,317,594 B1 | 11/2001 | Gossman et al. |
| 6,321,091 B1 | 11/2001 | Holland |
| 6,321,092 B1 | 11/2001 | Fitch |
| 6,327,479 B1 | 12/2001 | Mikkola |
| 6,360,102 B1 | 3/2002 | Havinis |
| 6,456,852 B2 | 9/2002 | Bar |

| | | |
|---|---|---|
| 6,529,490 B1 | 3/2003 | Oh |
| 6,529,500 B1 | 3/2003 | Pandharipande |
| 6,529,722 B1 | 3/2003 | Heinrich |
| 6,539,232 B2 | 3/2003 | Hendrey et al. |
| 6,549,522 B1 | 4/2003 | Flynn |
| 6,584,307 B1 | 6/2003 | Antonucci |
| 6,587,691 B1 | 7/2003 | Granstam |
| 6,600,927 B2 | 7/2003 | Hamilton |
| 6,650,901 B1 | 11/2003 | Schuster |
| 6,678,357 B2 | 1/2004 | Stumer et al. |
| 6,744,856 B2 | 6/2004 | Karnik et al. |
| 6,744,858 B1 | 6/2004 | Ryan |
| 6,771,742 B2 | 8/2004 | McCalmont et al. |
| 6,775,534 B2 | 8/2004 | Lindgren |
| 6,799,049 B1 | 9/2004 | Zellner et al. |
| 6,839,417 B2 | 1/2005 | Weisman |
| 6,847,618 B2 | 1/2005 | Laursen |
| 6,876,734 B1 | 4/2005 | Summers |
| 6,882,850 B2 | 4/2005 | McConnell et al. |
| 6,912,230 B1 | 6/2005 | Salkini |
| 6,940,826 B1 | 9/2005 | Simard |
| 6,940,950 B2 | 9/2005 | Dickinson |
| 6,963,557 B2 | 11/2005 | Knox |
| 6,968,044 B2 | 11/2005 | Beason |
| 6,985,747 B2 | 1/2006 | Chitihambaram |
| 6,993,355 B1 | 1/2006 | Pershan |
| 7,072,667 B2 | 7/2006 | Olrik |
| 7,106,717 B2 | 9/2006 | Rousseau |
| 7,110,773 B1 | 9/2006 | Wallace |
| 7,136,466 B1 | 11/2006 | Gao |
| 7,174,153 B2 | 2/2007 | Ehlers |
| 7,177,397 B2 | 2/2007 | McCalmont |
| 7,177,399 B2 | 2/2007 | Dawson |
| 7,260,186 B2 | 8/2007 | Zhu |
| 7,321,773 B2 * | 1/2008 | Hines et al. .............. 455/456.1 |
| 7,330,899 B2 | 2/2008 | Wong |
| 7,369,530 B2 | 5/2008 | Keagy |
| 7,382,773 B2 | 6/2008 | Schoeneberger |
| 7,394,896 B2 | 7/2008 | Norton |
| 7,428,571 B2 | 9/2008 | Ichimura |
| 7,436,785 B1 | 10/2008 | McMullen |
| 7,573,982 B2 | 8/2009 | Breen |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0086676 A1 | 7/2002 | Hendry |
| 2002/0102996 A1 | 8/2002 | Jenkins |
| 2002/0118650 A1 | 8/2002 | Jagadeesan |
| 2002/0126656 A1 | 9/2002 | Park |
| 2002/0158777 A1 | 10/2002 | Flick |
| 2002/0173317 A1 | 11/2002 | Nykanen |
| 2002/0191595 A1 | 12/2002 | Mar |
| 2002/0197991 A1 | 12/2002 | Anvekar |
| 2003/0009277 A1 | 1/2003 | Fan |
| 2003/0012148 A1 | 1/2003 | Peters |
| 2003/0026245 A1 | 2/2003 | Ejzak |
| 2003/0069002 A1 | 4/2003 | Hunter |
| 2003/0072318 A1 | 4/2003 | Lam |
| 2003/0109245 A1 | 6/2003 | McCalmont |
| 2003/0119521 A1 | 6/2003 | Tipnis |
| 2004/0032485 A1 | 2/2004 | Stephens |
| 2004/0043775 A1 | 3/2004 | Kennedy |
| 2004/0047461 A1 | 3/2004 | Weisman et al. |
| 2004/0132465 A1 | 7/2004 | Mattila |
| 2004/0146040 A1 | 7/2004 | Phan-Anh |
| 2004/0150518 A1 | 8/2004 | Phillips |
| 2004/0181689 A1 | 9/2004 | Kiyoto |
| 2004/0190497 A1 | 9/2004 | Knox |
| 2004/0198386 A1 | 10/2004 | Dupray |
| 2004/0203568 A1 | 10/2004 | Kirtland |
| 2004/0229632 A1 | 11/2004 | Flynn |
| 2005/0030977 A1 | 2/2005 | Casey |
| 2005/0043037 A1 | 2/2005 | Loppe |
| 2005/0083911 A1 | 4/2005 | Grabelsky |
| 2005/0107673 A1 | 5/2005 | Ball |
| 2005/0136885 A1 | 6/2005 | Kaltsukis |
| 2005/0169248 A1 | 8/2005 | Truesdale |
| 2005/0201528 A1 | 9/2005 | Meer |
| 2005/0232252 A1 | 10/2005 | Hoover |
| 2005/0265318 A1 | 12/2005 | Khartabil |
| 2005/0271029 A1 | 12/2005 | Iffland |
| 2005/0289097 A1 | 12/2005 | Trossen |
| 2006/0008065 A1 | 1/2006 | Longman |
| 2006/0023747 A1 | 2/2006 | Koren et al. |
| 2006/0026288 A1 | 2/2006 | Acharya |
| 2006/0135177 A1 | 6/2006 | Winterbottom |
| 2006/0188083 A1 | 8/2006 | Breen |
| 2006/0258380 A1 | 11/2006 | Liebowitz |
| 2007/0003024 A1 | 1/2007 | Olivier |
| 2007/0022011 A1 | 1/2007 | Altberg |
| 2007/0027997 A1 | 2/2007 | Polk |
| 2007/0041513 A1 | 2/2007 | Gende |
| 2007/0049288 A1 | 3/2007 | Lamprecht |
| 2007/0054676 A1 | 3/2007 | Duan |
| 2007/0121601 A1 | 5/2007 | Kikinis |
| 2007/0160036 A1 | 7/2007 | Smith |
| 2007/0162228 A1 | 7/2007 | Mitchell |
| 2007/0242660 A1 | 10/2007 | Xu |
| 2007/0253429 A1 | 11/2007 | James |
| 2008/0037715 A1 | 2/2008 | Prozeniuk |
| 2008/0063153 A1 | 3/2008 | Krivorot |
| 2008/0065775 A1 | 3/2008 | Polk |
| 2008/0186164 A1 | 8/2008 | Emigh |
| 2008/0214202 A1 | 9/2008 | Toomey |
| 2009/0003535 A1 | 1/2009 | Grabelsky |

FOREIGN PATENT DOCUMENTS

WO    WO2004/025941    3/2004

OTHER PUBLICATIONS

Examiner'Office Letterin Japanese Patent Application No. 2006-542691 dated Sep. 7, 2009.
JP Laid-Open Gazette No. 2004-158947 (English abstract only).
JP Laid-Open Gazette No. 2007-507123 (counterpart English text US Patent Application Publication No. 2007/0054676),
T. Hattori, "Wireless Broadband Textbook," IDG Japan, Jun. 10, 2002, p. 142-p. 143 (no English text).
Extended European Search Report from EPO in European Appl. No. 06827172.5 dated Dec. 29, 2009.

* cited by examiner

MOBILE BASED AREA EVENT HANDLING WHEN CURRENTLY VISITED NETWORK DOES NOT COVER AREA

The present application is a continuation of U.S. application Ser. No. 11/399,528, to ZHU, entitled "MOBILE BASED AREA EVENT HANDLING WHEN CURRENTLY VISITED NETWORK DOES NOT COVER AREA" filed on Apr. 7, 2006 now abandoned; which in turn is a continuation of U.S. application Ser. No. 10/459,448, to ZHU, entitled "MOBILE BASED AREA EVENT HANDLING WHEN CURRENTLY VISITED NETWORK DOES NOT COVER AREA" filed on Jun. 12, 2003 now abandoned; and the present application is a continuation-in-part of U.S. application Ser. No. 12/007,948 to HINES, entitled "AREA WATCHER FOR WIRELESS NETWORK" filed on Jan. 17, 2008; and the present application is a continuation-in-part of U.S. application Ser. No. 11/360,579 to HINES, entitled "AREA WATCHER FOR WIRELESS NETWORK" filed on Feb. 4, 2006; which are respective continuation and divisional applications of U.S. application Ser. No. 10/318,171 to HINES, entitled "AREA WATCHER FOR WIRELESS NETWORK" filed Dec. 13, 2002, now U.S. Pat. No. 7,321,773, the entireties of all of which are expressly incorporated herein by reference.

BACKGROUND OF THE INVENTION

1. Field of the Invention

This invention relates generally to wireless and long distance carriers, Internet Service Providers (ISPs), and information content delivery services/providers and long distance carriers. More particularly, it relates to location services for the wireless industry.

2. Background of Related Art

The Location Interoperability Forum (LIF), the Wireless Application Protocol (WAP) Forum, and 3$^{rd}$ Generation Partnership Project (3GPP) have attempted to define an area trigger via Application Protocol Interfaces (APIs) specific to these groups. This type of service allows a location application to define an area event for a mobile. For example, an area event may be that the target mobile entered or left a pre-defined geographic area, and when the area event occurs, which in turn triggers notification to the relevant application.

Currently 3GPP is modifying the location service specification 23.271 regarding area event location services. 3GPP recommends a mobile-based solution. In this scenario, a pre-defined area event will be downloaded to the mobile, and it is the target mobile that detects whether the area event occurs. It is expected that the visited Gateway Mobile Location Center will translate a pre-defined geographic area to the corresponding network identities, e.g., cells, location areas, etc. Because of this, there is a problem in handling a pre-defined target area when the currently visited network does not provide coverage for the target area. Since the Visited-Gateway Mobile Location Center does not know the target area, it will reject such a request. This will downgrade the service for roaming scenarios support.

Conventionally, the Home Gateway Mobile Location Center may reject the deferred area event location service when the visited Gateway Mobile Location Center informs that the predefined target area is not in it's service coverage. Or, as an option, the Home Gateway Mobile Location Center may modify the original area event to occur when the target mobile leaves the current serving Public Land Mobile Network. The Home Gateway Mobile Location Center then re-sends the original area event request to the new visited GMLC. If it fails again (e.g., if the new visited network still does not cover the target area), this procedure will repeat.

Unfortunately, particularly with respect to the second option, if the mobile is on the boundary between two networks, the Home Gateway Mobile Location Center will generate a significant amount of traffic.

Thus, conventional area event handling systems are disadvantageous because they are inefficient, limiting the relevant service, and as a result may cause rejection of the deferred area event location service in roaming scenarios.

SUMMARY OF THE INVENTION

In accordance with the principles of the present invention, a method and apparatus for reporting an area-based event in a wireless network are provided, comprising defining a given target area event. At least one target area definition is sent to a mobile device to be watched. Notification is received that a visited public land mobile network currently visited by the mobile device does not serve the given target area. The target area event is modified such that notification to a home location service will be triggered when the mobile device enters a wireless network that serves the given target area, wherein an original area event request is re-aimed.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1A:
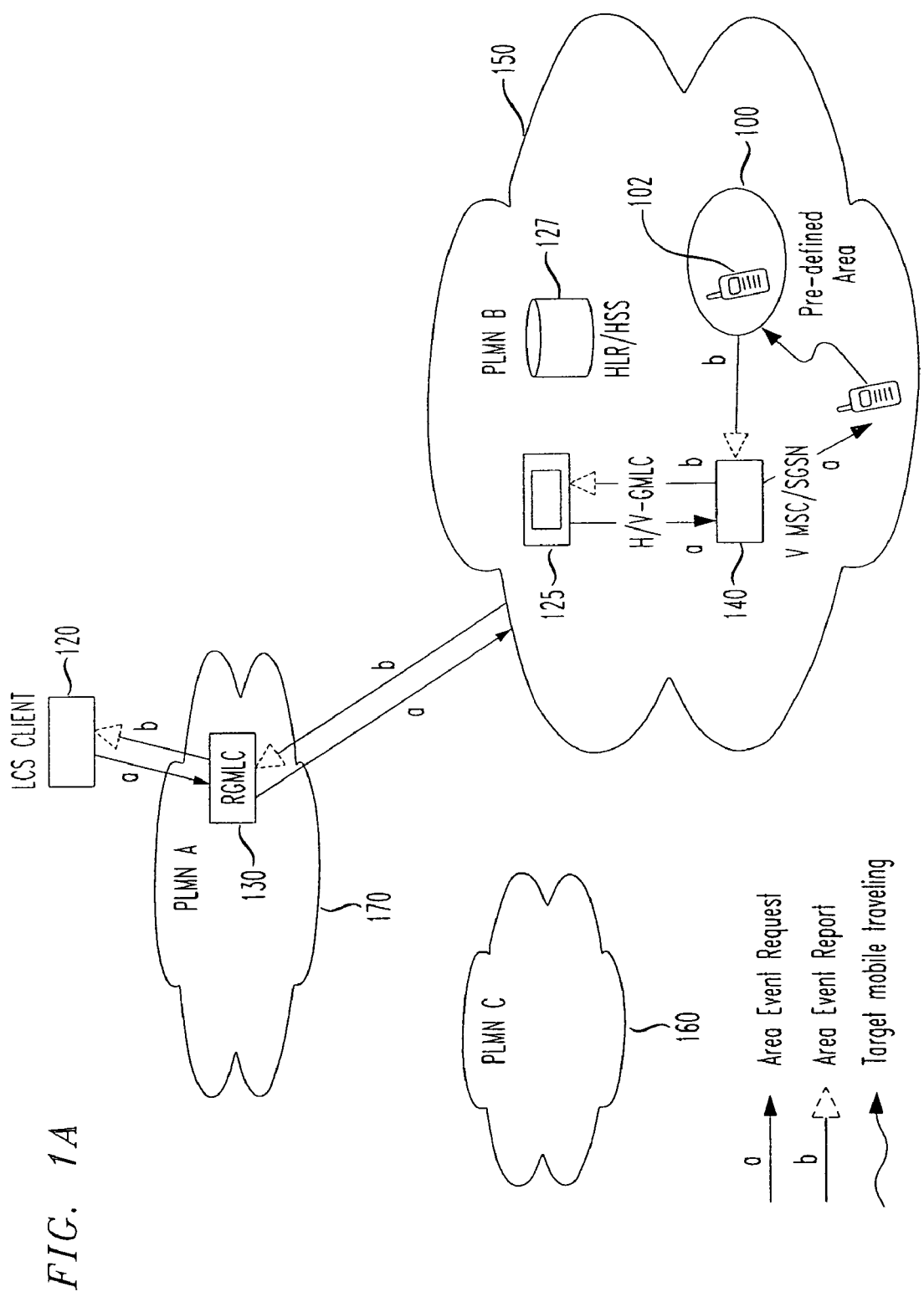
FIG. 1A shows a typical area event location service when a target mobile is in its Home Public Land Mobile Network when a request is initiated, and a pre-defined triggering area is in the Home Public Land Mobile Network.

The inventive solution enables a location system to be informed when a target mobile enters one of multiple possible networks covering a pre-defined target area, and re-aim the original area event request. It also overcomes the potential issue related to network selection when there are multiple networks available at a certain area.

With this area event location service, a location based service provider is able to pre-define a geographic area, which can be a geopolitical name, one or more network identities, or an area described by X, Y coordination, and type of event. The event can be that the target subscriber enters or leaves the pre-defined area. Once this kind of location request is sent to the network, an event trigger is sent to the target mobile. When the pre-defined event occurs, the mobile device (UE) initiates a location report to the initiator of the request.

The visited Gateway Mobile Location Center is responsible for converting the predefined area to network identities known locally in the visited network (Home Gateway Mobile Location Center may not know), for modifying the area event, and for sending the modified area event to the target mobile. However, considering the roaming scenarios, the visited network may not be the network that has coverage on the target area and hence it may reject the request. This is a technical issue that needs to be resolved, so that area event location service can be functional even in various roaming scenarios.

An enhanced procedure in accordance with the principles of the present invention is based on a Public Land Mobile Network list with estimated geographic coverage areas stored in the Home GMLC. The list includes the Public Land Mobile Networks defined in "HPublic Land Mobile Network Selector with Access Technology" and "Operator Controlled Public Land Mobile Network Selector with Access Technology" (3GPP 23.122), and the estimated service coverage of each Public Land Mobile Network in the stored list. The "Home Public Land Mobile Network Selector with Access Technology" and "Operator Controlled Public Land Mobile Network Selector with Access Technology" are defined for network access selection procedure in GSM. These lists are to be stored in the SIM of each subscriber. When a mobile enters new network coverage, it uses these lists to make a decision for network access selection. Although the network selection can be done manually by the user, these lists may be pre-defined by the operator based on roaming agreements, so the final decision should be up to one of the Public Land Mobile Networks in these lists.

When the Home Gateway Mobile Location Center discovers that the current visited Public Land Mobile Network does not serve the original target area, it modifies the area event to UE entering one of Public Land Mobile Networks, so that the Home Gateway Mobile Location Center will get notified when the target UE enters a Public Land Mobile Network that serves the original target area. After being notified, the Home Gateway Mobile Location Center re-sends the original area event location service request to the target UE.

FIG. 1A shows a typical area event location service when the target mobile is in its Home Public Land Mobile Network (H-PLMN) when a request is initiated, and a pre-defined triggering area is in the Home Public Land Mobile Network.

In particular, as shown in FIG. 1A, a mobile device 102 moves within a home network 150 into a pre-defined area 100, causing a triggering event. A location client 120 resides in a separate network 170, which includes a remote GMLC 130. The home network 150 includes, e.g., a home/visited GMLC 125, an HLR/HSS 127, and a visited MSC/SGSN 140.

Figure 1B:
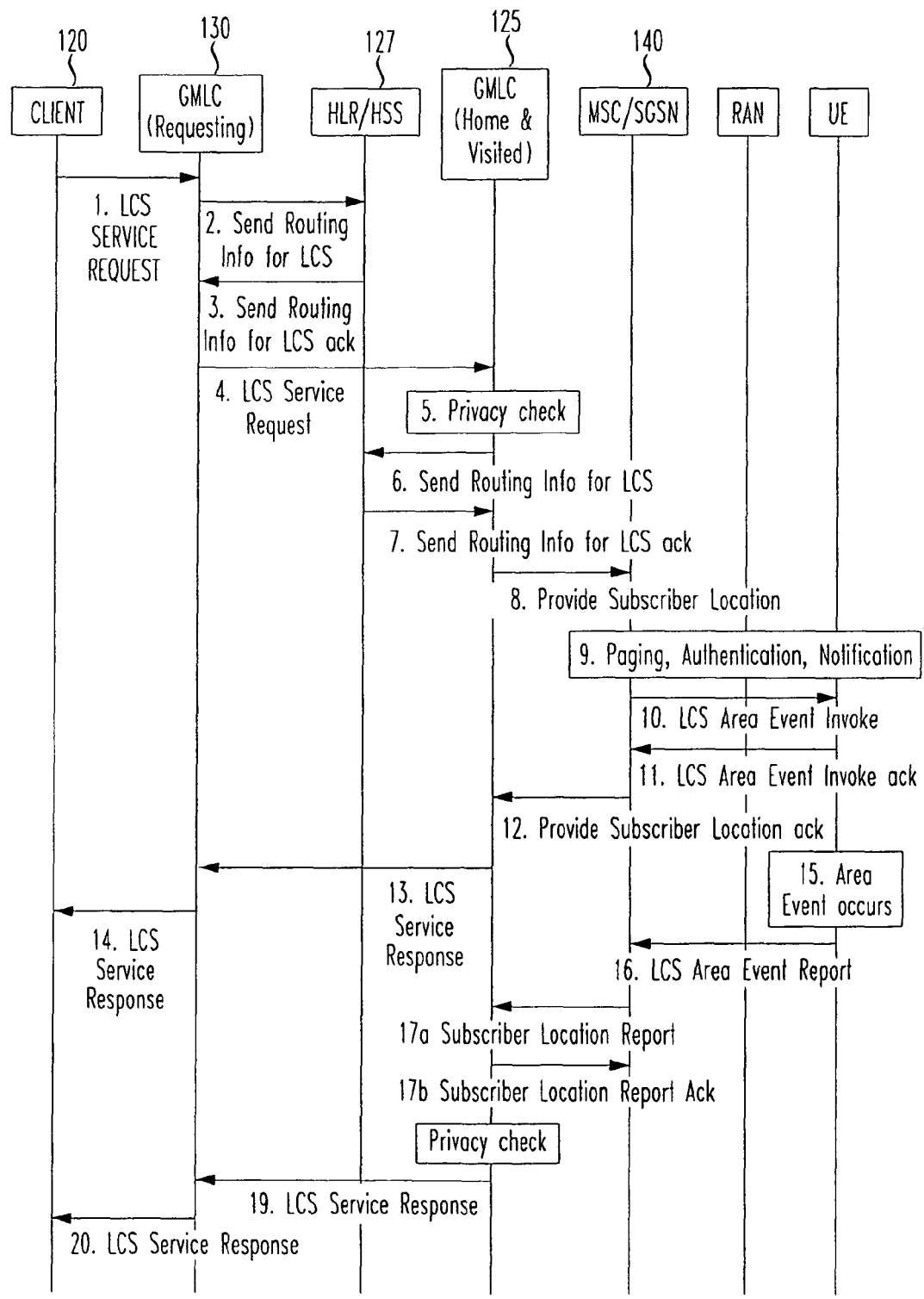
FIG. 1B shows a MESSAGE FLOW diagram showing the relevant messages for FIG. 1A.

FIG. 1B shows a MESSAGE FLOW diagram showing the relevant messages for FIG. 1A.

In particular, as shown in FIG. 1B, in step 1, an LCS Service Request contains a change of area type deferred location request information, i.e., details of the target area and the nature of the event, whether the event to be reported is the User Equipment (UE), i.e., a mobile device, being inside, entering into or leaving the target area, etc. The LCS service request contains information such as whether the deferred area event may be reported one time only, or several times. If the change of area event is reported one time only, the Location Service request is completed after the first area event has occurred. The REQUESTING-Gateway Mobile Location Center (R-GMLC) assigns a LDR reference number to this LCS Service request. If the target area is expressed by local coordinate system or geopolitical name, the REQUESTING-Gateway Mobile Location Center shall convert the target area to geographical area expressed by a shape defined in 3GPP TS23.032.

In step 2, if the REQUESTING-Gateway Mobile Location Center already knows, (e.g., from a previous location request or an internal lookup table), or is able to determine, (e.g., it is possible to use a DNS lookup mechanism similar to IETF RFC 2916), the network address of the Home Gateway Mobile Location Center (H-GMLC) of the target UE, or in case the location service request contains the target UE's pseudonym, which includes the target UE's Home-Gateway Mobile Location Center address, or a pseudonym from which the target UE's Home-Gateway Mobile Location Center address can be deduced, then this step 2 and step 3 may be skipped. Otherwise, the REQUESTING-Gateway Mobile Location Center sends a SEND_ROUTING_INFO_FOR_LCS message to the home HLR/HSS of the target UE to be located with the IMSI or MSISDN of the UE.

In step 3, the HLR/HSS verifies whether the REQUESTING-Gateway Mobile Location Center is authorized to request UE location information. If not, an error response is returned. Otherwise the HLR/HSS returns one or several of the network addresses of the current SGSN and/or VMSC/MSC server, the LCS core network signaling capabilities of the serving nodes if available and whichever of the IMSI and MSISDN that was not provided in step 2. The HLR/HSS returns the address of the Home Gateway Mobile Location Center (H-GMLC). The HLR/HSS also returns the address of the PPR and Visited Gateway Mobile Location Center (V-GMLC), if available.

In step 4, the REQUESTING-Gateway Mobile Location Center finds out that it is the HOME GMLC, the signaling steps 4, 13 and 19 are skipped. If the REQUESTING-Gateway Mobile Location Center did not receive the Home Gateway Mobile Location Center address in step 3 and can not retrieve the Home Gateway Mobile Location Center address in some other way (e.g. DNS lookup), then steps 4, 5, 6, 7 and 8 are skipped and the REQUESTING-Gateway Mobile Location Center directly sends the PSL message to the serving node. Otherwise, the REQUESTING-Gateway Mobile Location Center sends the location request to the HOME GMLC. If one or several of the network addresses of the current SGSN and/or VMSC/MSC server, the LCS core network signaling capabilities of the serving nodes, IMSI and MSISDN for the target UE, and the Visited Gateway Mobile Location Center and the PPR have been retrieved in step 3, the REQUESTING-Gateway Mobile Location Center passes the information with the location request to the HOME GMLC. The REQUESTING-Gateway Mobile Location Center also sends the service coverage information to the HOME GMLC, if the information is available.

In step 5, the Home Gateway Mobile Location Center verifies whether the REQUESTING-Gateway Mobile Location Center is authorized to request UE location information. If the REQUESTING-Gateway Mobile Location Center is not authorized, an error response is returned. If the LCS service request contains the pseudonym of the target UE and the Home Gateway Mobile Location Center cannot resolve the PMD address from the pseudonym, the Home Gateway Mobile Location Center itself determines the verinym (MSISDN or IMSI) of the target UE. If the Home Gateway Mobile Location Center can resolve the address of PMD from the pseudonym, the Home Gateway Mobile Location Center requests the verinym from its associated PMD, see clause 9.1.1.3. In this case, if Home Gateway Mobile Location Center is not able to obtain the verinym of the target UE, the Home Gateway Mobile Location Center cancels the location request. The Home Gateway Mobile Location Center performs a privacy check on the basis of the UE user's privacy profile stored in the Home Gateway Mobile Location Center and the capabilities of the serving nodes (MSC/VLR and/or SGSN), if available. The Home Gateway Mobile Location Center may ask the PPR to perform the privacy check as described in clause 9.1.1.1. If the key of the UE user's privacy profile (i.e. MSISDN or IMSI) is not available, the privacy check in this step is performed after step 7. The HOME GMLC/PPR verifies LCS barring restrictions in the UE user's privacy profile in the HOME GMLC/PPR. In verifying the barring restrictions, barring of the whole location request is assumed if any part of it is barred or any requisite condition is not satisfied. If the location service request is to be barred, an error response is returned to the REQUESTING-Gateway Mobile Location Center or the LCS client. As a result of the privacy check, the HOME GMLC/PPR selects an indicator of the privacy check related action and/or a pseudo-external identity.

In step 6, if the Home Gateway Mobile Location Center already knows both the VMSC/MSC server or SGSN location or the network address of Visited Gateway Mobile Location Center and IMSI for the particular MSISDN or PDIP address, (e.g. from a previous location request), the rest of this step and step 7 may be skipped. Otherwise, the Home Gateway Mobile Location Center sends a SEND_ROUTING_INFO_FOR_ LCS message to the home HLR/HSS of the target UE to be located with the IMSI, PDIP address or MSISDN of this UE.

In step 7, the HLR/HSS verifies the network address of the Home Gateway Mobile Location Center in order to check that the Home Gateway Mobile Location Center is authorized to request UE location information. The HLR/HSS then returns one or several of the network addresses of the current SGSN and/or VMSC/MSC server, the LCS core network signaling capabilities of the serving nodes and whichever of the IMSI and MSISDN was not provided in step 2 or 6 for the particular UE. The HLR/HSS may also return the address of the VISITED-GMLC, if available.

In step 8, in this scenario, the Home Gateway Mobile Location Center finds out itself is also the VISITED-GMLC, and the pre-defined area of the area event in the received location request is in its service coverage. If the received target area is expressed by a shape defined in 3GPP TS23.032, Visited Gateway Mobile Location Center converts the target area into an Area Definition consisting of the corresponding list of cell identities, location areas or routing area. If the received target area is expressed by country code or Public Land Mobile Network identity, the Visited Gateway Mobile Location Center shall use the country code or Public Land Mobile Network identity as the Area Definition. The Visited Gateway Mobile Location Center sends the Area Definition to MSC/SGSN in the Provide Subscriber Location request (deferred) and includes the LDR reference number, the REQUESTING-Gateway Mobile Location Center address and the Home Gateway Mobile Location Center address in the request. The message defines whether the event to be reported is the UE being inside, entering into or leaving the area. The message may also include information such as the minimum interval time between area event reports, or whether the deferred area event may be reported one time only or several times, if applicable.

In step 9, the MSC/SGSN verifies the UE capabilities with regard to the change of area event. If either the MSC/SGSN or the UE does not support the deferred location request for the change of area event (for temporary or permanent reasons), a Provide Subscriber Location return error shall be returned with a suitable cause in step 7. If the UE is in idle mode, the core network performs paging, authentication and ciphering. If privacy notification/verification is requested, the MSC/SGSN sends an LCS Location Notification Invoke message to the target UE indicating the change of area type deferred location request and whether privacy verification is required. LCS Location Notification is further specified in clauses 9.1.2 and 9.1.6. If privacy verification was requested, the UE returns an LCS Location Notification Return Result to the MSC/SGSN indicating whether permission is granted or denied.

In step 10, the MSC/SGSN sends the LCS Area Event Invoke to the UE carrying the Area Definition, other area event information, the LDR reference number, the REQUESTING-Gateway Mobile Location Center address and the Home Gateway Mobile Location Center address. The message also defines whether the event to be reported is the UE being inside, entering into, leaving the area. The message may also include additional information such as the minimum interval time between area event reports, and whether the deferred area event may be reported one time only, or several times, if applicable.

In step 11, if the LCS Area Event Invoke is successfully received by the UE and the UE supports the change of area type deferred location request, the UE sends acknowledgement to MSC/SGSN and begins monitoring for the change of area event. The UE determines whether it is inside, entering into or leaving the target area by comparing the current serving cell identity, location area, routing area, Public Land Mobile Network identity or country code to the Area Definition received from the MSC/SGSN. In case of soft handover, it is sufficient if one of the cells belongs to the target area. In case the Area Definition consists of a location or routing area, Public Land Mobile Network or country identity the UE checks for the area event during the normal location or routing area update procedure. The change of area event detection mechanism preferably does not influence on the normal UE cell selection and reselection procedures. If the UE does not support the deferred location request (for temporary or permanent reasons), it sends the LCS Area Event Invoke acknowledgement (ack) with an appropriate error cause.

In step 12, if either the MSC/SGSN or the UE does not support the deferred location request for the change of area event (for temporary or permanent reasons), a Provide Subscriber Location return error is returned to the Visited Gateway Mobile Location Center with a suitable cause. If both the SGSN/MSC and UE support the deferred location request for the change of area event, a Provide Subscriber Location ack is returned to the Visited Gateway Mobile Location Center without a location estimate. MSC/SGSN preferably includes the result of the notification/verification in the response to the VISITED-GMLC, if the notification/verification is needed. The response message includes the LDR reference number, the REQUESTING-Gateway Mobile Location Center address and the Home Gateway Mobile Location Center address. The change of area event invoke result is preferably also included, if necessary. After sending the Provide Subscriber Location ack to the VISITED-GMLC, the deferred location request is completed in the MSC/SGSN.

In steps 13 and 14, the Visitor Home Gateway Mobile Location Center returns the LCS Service Response via REQUESTING-Gateway Mobile Location Center to the LCS Client to notify whether the request was successfully accepted or not.

In step 15, the UE detects that the requested area event has occurred.

In step 16, before sending the LCS Area Event Report the UE establishes either a CS radio connection or PS signaling connection. The UE sends the LCS Area Event Report to the VMSC/SGSN including the original LDR reference number, the REQUESTING-Gateway Mobile Location Center address and the Home Gateway Mobile Location Center address. The report also includes the result of the notification/verification procedure, if the notification/verification is needed. If the UE was requested to report the change of area event one time only, the deferred location request is completed. In case multiple reports were requested, the UE preferably does not send a repeated LCS Area Event Report more often than the requested minimum interval indicated in the LCS Area Event Invoke.

In step 17a, if the MSC/SGSN does not support the deferred location request for the change of area event (for temporary or permanent reasons), the MSC/SGSN sends the subscriber location report to its associated Visited Gateway Mobile Location Center with a suitable error cause. Otherwise, the MSC/SGSN sends the subscriber location report to its associated Visited Gateway Mobile Location Center with an indication of the event occurrence, the LDR reference number, the REQUESTING-Gateway Mobile Location Center address and the Home Gateway Mobile Location Center address. Visited Gateway Mobile Location Center sends an acknowledgement to MSC/SGSN in step 13b and the MSC/SGSN may record billing information.

In step 17b, if the Visited Gateway Mobile Location Center does not supports the deferred location request for the change of area event (for temporary or permanent reasons), the Visited Gateway Mobile Location Center sends an LCS Service Response to the Home Gateway Mobile Location Center with a suitable error cause. Otherwise, the Visited Gateway Mobile Location Center sends the LCS Service Response to the Home Gateway Mobile Location Center with an indication of the event occurrence, the LDR reference number, the REQUESTING-Gateway Mobile Location Center address and the Home Gateway Mobile Location Center address. The LDR reference number, the REQUESTING-Gateway Mobile Location Center address and the Home Gateway Mobile Location Center address will be used to identify the source of the original deferred location request in the case that the UE has relocated before the area event occurred.

In step 18, the Home Gateway Mobile Location Center performs the privacy check as described in clause 9.1.1.

In step 19, the Home Gateway Mobile Location Center sends the LCS Service Response to REQUESTING-GMLC. Unless multiple reports were requested, the deferred location request is completed in the Home Gateway Mobile Location Center after sending the LCS Service Response to the REQUESTING-GMLC.

In step 20, the REQUESTING-Gateway Mobile Location Center sends the LCS Service Response to the LCS client. Unless multiple reports were requested, the deferred location request is completed in the REQUESTING-Gateway Mobile Location Center after sending the LCS Service Response to the LCS client.

Figure 2A:
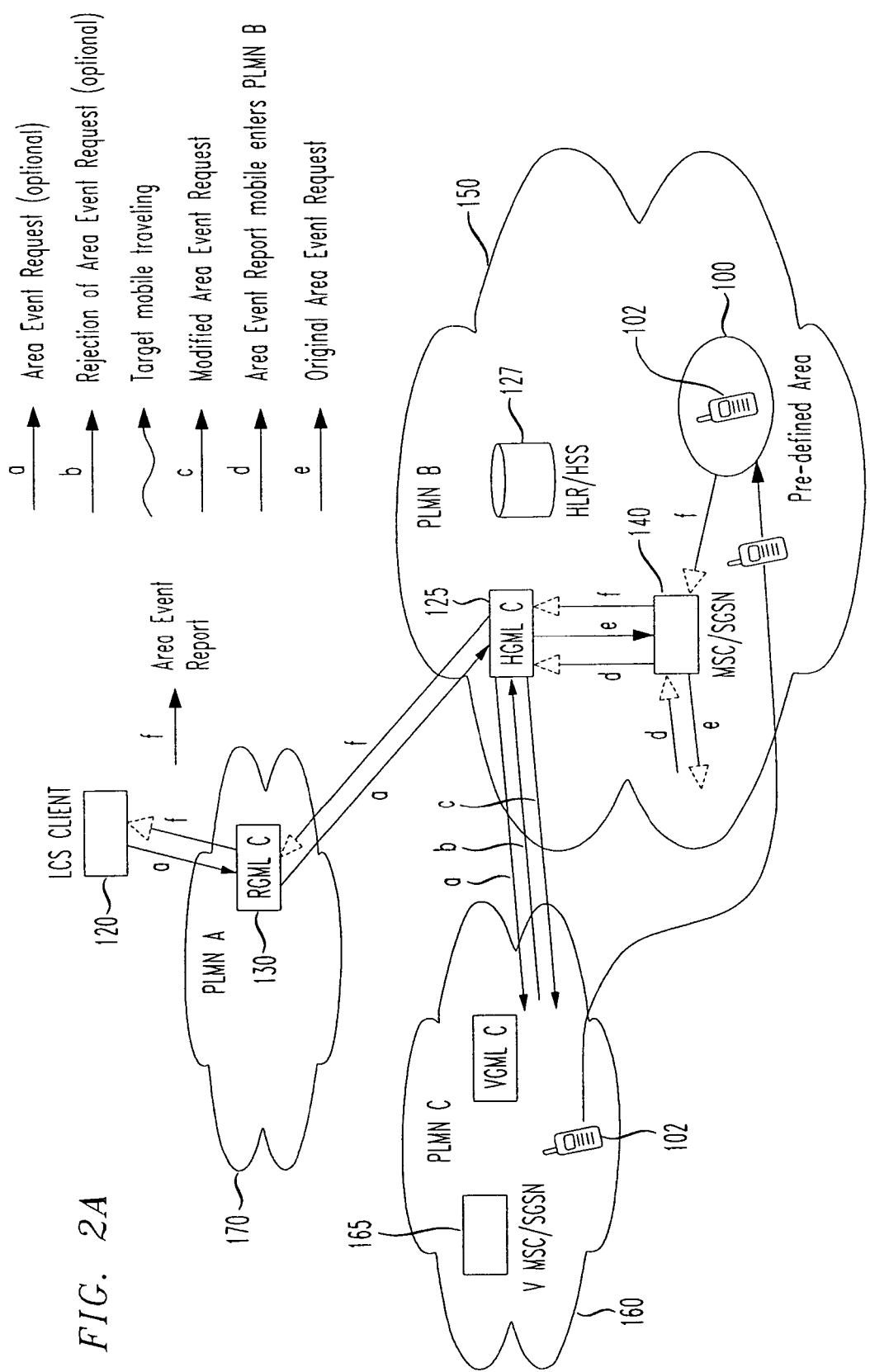
FIG. 2A shows an area event location service when a target mobile is in a visited Public Land Mobile Network when a request is initiated, and the pre-defined triggering area is in the Home Public Land Mobile Network.

FIG. 2A shows an area event location service when the target mobile is in a visited Public Land Mobile Network when a request is initiated, and a pre-defined triggering area is in the Home Public Land Mobile Network.

In particular, as shown in FIG. 2A, a mobile device 102 moves from a visited network 160 to a home network 150 into a pre-defined area 100, causing a triggering event. A location client 120 resides in a separate network 170, which includes a remote GMLC 130. The home network 150 includes, e.g., a home GMLC 125, an HLR/HSS 127, and a MSC/SGSN 140.

Figure 2B:
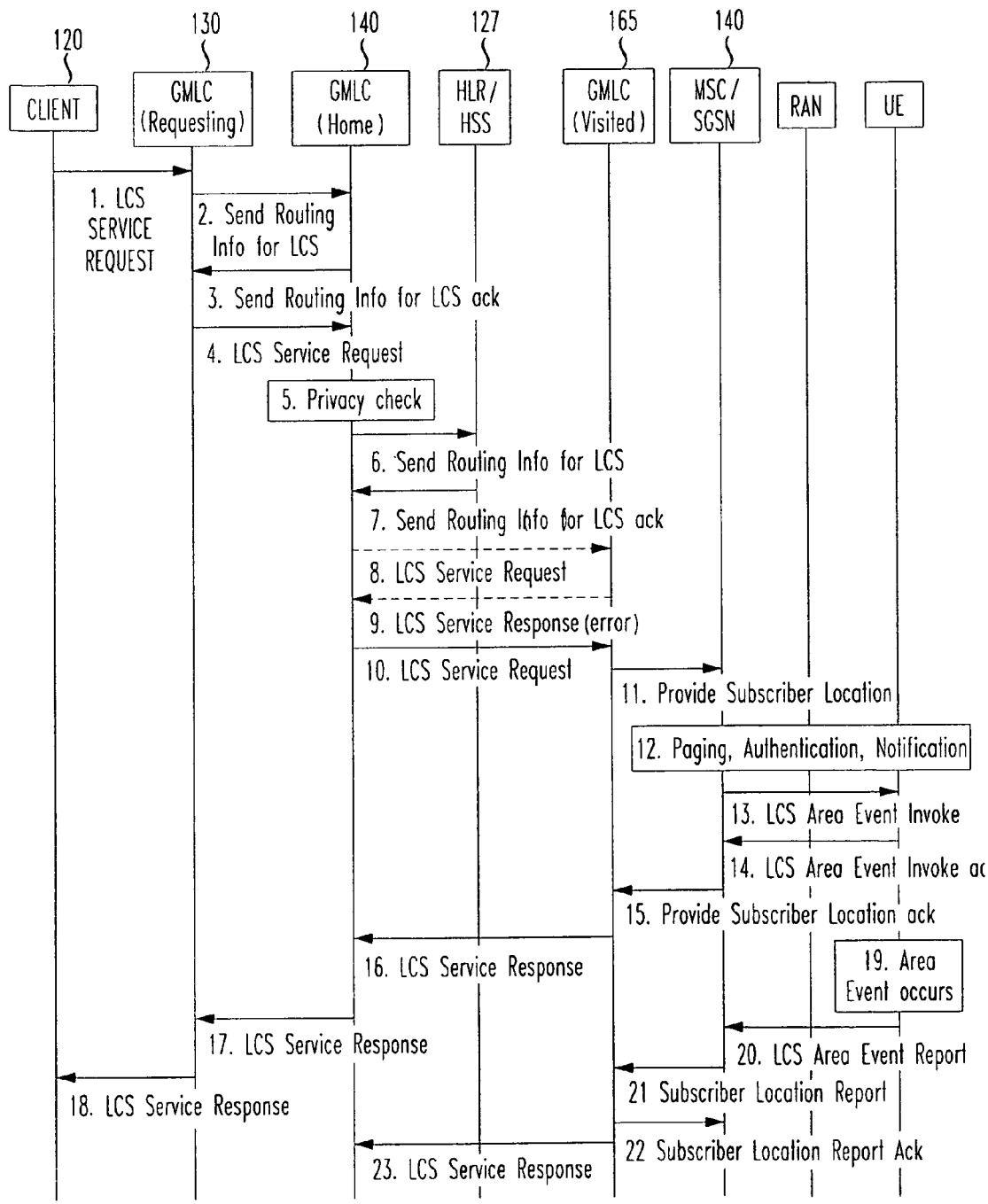
FIG. 2B shows a MESSAGE FLOW diagram showing the relevant messages for FIG. 2A.
Figure 2B:
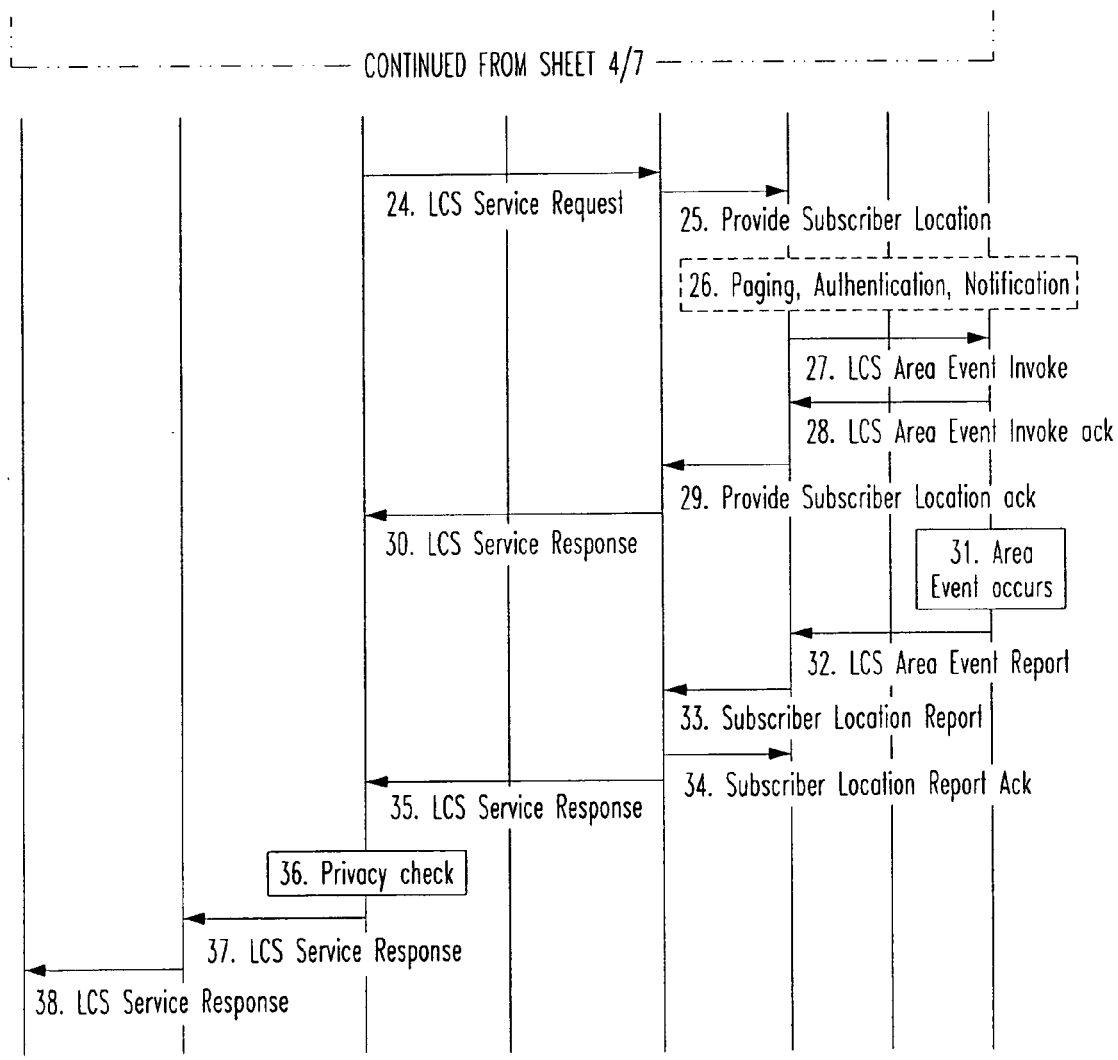

FIG. 2B shows a MESSAGE FLOW diagram showing the relevant messages for FIG. 2A.

In particular, as shown in FIG. 2B, steps 1 to 7 are identical to the similarly numbered steps shown in and described with connection to FIG. 1B.

In step 8 of FIG. 2B, without implementing the present invention, the Home Gateway Mobile Location Center sends the location request to the Visited Gateway Mobile Location Center with all network addresses associated with this request. It is possible that the Home Gateway Mobile Location Center may still initiate this step when the Home Gateway Mobile Location Center is not sure if the current visited Public Land Mobile Network covers the pre-defined area (also see step 10).

In accordance with the principles of the present invention, a Home Gateway Mobile Location Center may realize that the current visited Public Land Mobile Network does not cover the pre-defined area by comparing the pre-defined area with stored information of the coverage of the roaming partners networks. Then step 9 and 10 are skipped.

In step 9, the Visited Gateway Mobile Location Center finds out that it cannot convert the pre-defined area in geographic shapes included in the area event location request to a network identity; the Visited Gateway Mobile Location Center rejects the request and sends a LCS Service Response with error. Without implementing this invention, the Home Gateway Mobile Location Center rejects the request as well. Procedure of area event location request with steps 17 and 18 and ends. With implementing this invention, the procedure continues with step 10.

In step 10, with implementation of the present invention, the Home Gateway Mobile Location Center can generate a modified deferred LCS service request in order to get notified when the target UE enters a Public Land Mobile Network that serves the target area. The modified target area event is that the target UE enters one of the Public Land Mobile Networks that serve the original target area. Note that the new area event may include multiple Public Land Mobile Networks (identified by Public Land Mobile Network IDs) if there are more than one Public Land Mobile Network that serves the original target area, based on the stored Public Land Mobile Network list and the corresponding estimated coverage in the HOME GMLC. To ensure that the mobile will select a Public Land Mobile Network in the Public Land Mobile Network list being sent, the Home Gateway Mobile Location Center includes both the "Home Public Land Mobile Network Selector with Access Technology" and "Operator Controlled Public Land Mobile Network Selector" defined in 3GPP TS 23.122. The Home Gateway Mobile Location Center then generates a new location request with the new defined area event and the same rest of the information in the original request and sends to the VISITED-GMLC, meanwhile the Home Gateway Mobile Location Center stores the original area event location request received from REQUESTING-GMLC.

Steps 11 to 15 are identical to steps 8 to 12 shown in and described with connection to FIG. 1B.

In step 16, the Visited Gateway Mobile Location Center passes the LCS Service Response to the HOME GMLC.

Steps 17 and 18 are identical to steps 13 and 14 shown in and described with connection to FIG. 1B.

In step 19, the UE detects that it enters one of Public Land Mobile Networks included in the modified area event request, after the UE selects a Public Land Mobile Network either automatically and manually. UE then sends an LCS Area Event Report to the visited MSC/SGSN with the information included in the original area event requests, e.g. network addresses of HOME GMLC, REQUESTING-Gateway Mobile Location Center and the LDR reference number, so that the new Visited Gateway Mobile Location Center in the newly selected Public Land Mobile Network knows where to route the report.

Steps 20 to 22 are identical to steps 16 to 17b shown in and described in connection with FIG. 1B.

In step 23, the new Visited Gateway Mobile Location Center in the newly selected Public Land Mobile Network sends a LCS Service Response back to the HOME GMLC, included the network addresses of Home Gateway Mobile Location Center and REQUESTING-GMLC, and the LDR reference number.

In step 24, upon receipt of the notification that the target UE has entered a Public Land Mobile Network that serves the pre-defined area in the original area event location request, the Home Gateway Mobile Location Center sends the original LCS Service Request stored in Home Gateway Mobile Location Center to the new Visited Gateway Mobile Location Center (FIG. 2A shows Home Gateway Mobile Location Center is the new VISITED-GMLC, so this step is skipped).

Steps 25 to 29 are identical to steps 8 to 12 shown in and described in connection with FIG. 1B.

In step 30, the Visited Gateway Mobile Location Center sends a LCS Service Response back to HOME GMLC, acknowledging the delivery of area event to the UE. As the Home Gateway Mobile Location Center is actually the new Visited Gateway Mobile Location Center shown in FIG. 2A, this step is skipped.

In step 31, the UE detects the area event has occurred.

Steps 32 to 34 are identical to steps 16 to 17b shown in and described in connection with FIG. 1B.

In step 35, the Visited Gateway Mobile Location Center sends a LCS Service Response to HOME GMLC, to report the area event has occurred. As the Home Gateway Mobile Location Center is actually the new Visited Gateway Mobile Location Center shown in FIG. 2A, this step is skipped.

Steps 36 to 38 are identical to steps 18 to 20 shown in and described in connection with FIG. 1B.

Figure 3A:
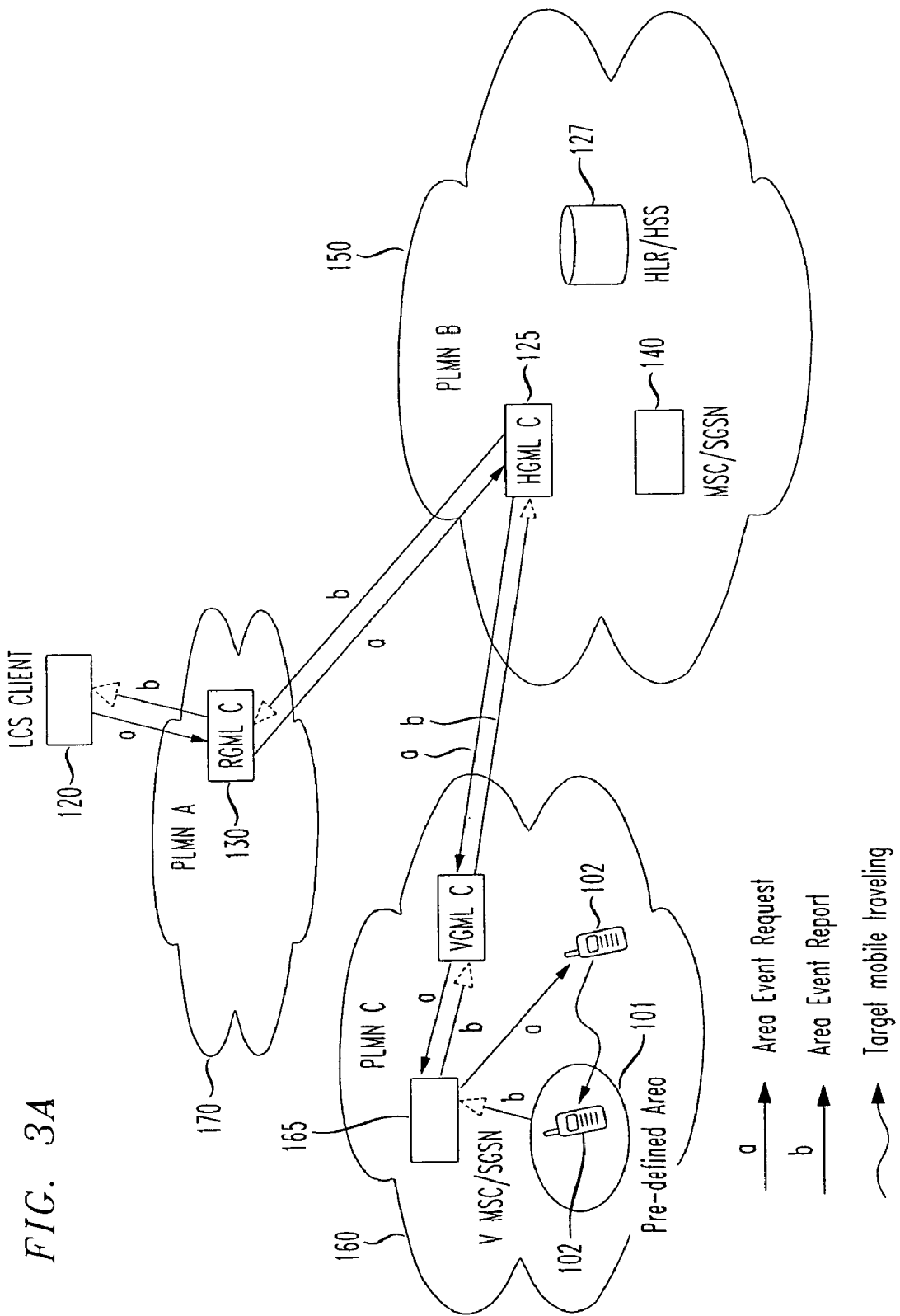
FIG. 3A shows a typical area event location service when a target mobile is not in its Home Public Land Mobile Network when a request is initiated, and the pre-defined triggering area is in a visited Public Land Mobile Network.
Figure 3B:
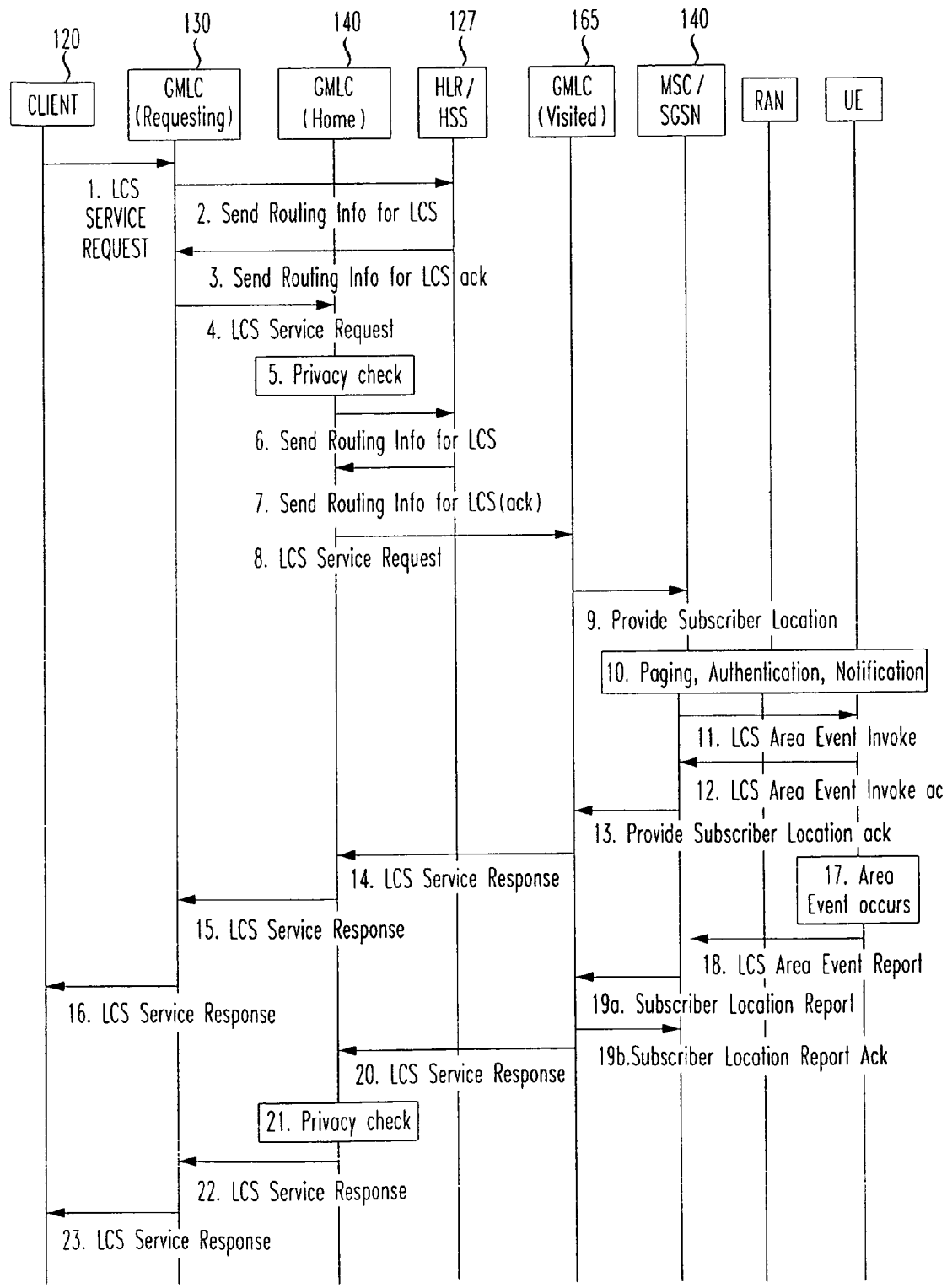
FIG. 3B shows a MESSAGE FLOW diagram showing the relevant messages for FIG. 3A.

FIG. 3A shows a typical area event location service when a target mobile is not in its Home Public Land Mobile Network when a request is initiated, and a pre-defined triggering area is in the visited Public Land Mobile Network. FIG. 3B shows a MESSAGE FLOW diagram showing the relevant messages for FIG. 3A.

In particular, as shown in FIG. 3B, steps 1 to 7 are identical to steps 1 to 7 shown in and described in connection with FIG. 1B.

In step 8, the Home Gateway Mobile Location Center sends the LCS Service Request to the VISITED-GMLC.

Steps 9 to 16 are identical to steps 11 to 18 shown in and described in connection to FIG. 2B.

Steps 17 to 19b are identical to steps 15 to 17b shown in and described in connection with FIG. 1B.

In step 20, the Visited Gateway Mobile Location Center sends a LCS Service Response to HOME GMLC, to report the area event has occurred. As the Home Gateway Mobile Location Center is actually the new Visited Gateway Mobile Location Center shown in FIG. 2A, this step is skipped.

Steps 21 to 23 are identical to steps 18 to 20 shown in and described in connection with FIG. 1B.

The present invention resolves issues relating to roaming support for area event location service efficiently, without generating significant amounts of core network traffic. Moreover, it is capable of providing service even when there are multiple networks covering a pre-defined target area.

The present invention is foreseen to have a substantial market with operators who want to provide area event location services.

While the invention has been described with reference to the exemplary embodiments thereof, those skilled in the art will be able to make various modifications to the described embodiments of the invention without departing from the true spirit and scope of the invention.

What is claimed is:

1. A method of reporting an area-based event in a wireless network, comprising:
    defining a given target area event;
    sending at least one target area definition to a mobile device to be watched;
    receiving notification that a visited public land mobile network currently visited by said mobile device does not serve said given target area; and
    modifying said target area event such that notification to a home location service will be triggered when said mobile device enters a wireless network that serves said given target area;
    wherein an original area event request is re-aimed.

2. The method of reporting an area-based event in a wireless network according to claim 1, further comprising:
    resending an original target area event location service request to said mobile device after notification that said mobile device has entered a wireless network that again serves said given target area.

3. The method of reporting an area-based event in a wireless network according to claim 1, further comprising:
    storing a public land mobile network list with said at least one target area accessible by a home location service.

4. The method of reporting an area-based event in a wireless network according to claim 2, further comprising:
    storing a public land mobile network list with said at least one target area accessible by a home location service.

5. The method of reporting an area-based event in a wireless network according to claim 1, wherein:
    said given target area is defined by at least one geographic boundary.

6. The method of reporting an area-based event in a wireless network according to claim 1, wherein:
    said given target area is defined by a municipality boundary.

7. The method of reporting an area-based event in a wireless network according to claim 1, wherein:
    said given target area is defined by X and Y coordinates.

8. The method of reporting an area-based event in a wireless network according to claim 1, wherein:
    said given target area is defined by at least one zip code.

9. The method of reporting an area-based event in a wireless network according to claim 1, wherein:
    said target area event includes a time range for activation.

10. The method of reporting an area-based event in a wireless network according to claim 1, wherein:
    said given target area is defined by at least one geographic boundary.

11. The method of reporting an area-based event in a wireless network according to claim 1, wherein said given target area event comprises:
    at least one geographic parameter associated with at least one time-based parameter.

12. Apparatus for providing a service to notify the occurrence of an area-based event in a wireless network, comprising:
    means for defining a given target area event;
    means for sending at least one target area definition to a mobile device to be watched;

means for receiving notification that a visited public land mobile network currently visited by said mobile device does not serve said given target area; and means for modifying said target area event such that notification to a home location service will be triggered when said mobile device enters a wireless network that serves said given target area;

wherein an original area event request is re-aimed.

13. Apparatus for providing a service to notify the occurrence of an area-based event in a wireless network according to claim 12, further comprising:

means for resending an original target area event location service request to said mobile device after notification that said mobile device has entered a wireless network that again serves said given target area.

14. Apparatus for providing a service to notify the occurrence of an area-based event in a wireless network according to claim 12, further comprising:

means for storing a public land mobile network list with said at least one target area accessible by a home location service.

15. Apparatus for providing a service to notify the occurrence of an area-based event in a wireless network according to claim 13, further comprising:

means for storing a public land mobile network list with said at least one target area accessible by a home location service.

16. Apparatus for providing a service to notify the occurrence of an area-based event in a wireless network according to claim 12, wherein:

said given target area is defined by at least one geographic boundary.

17. Apparatus for providing a service to notify the occurrence of an area-based event in a wireless network according to claim 12, wherein:

said given target area is defined by a municipality boundary.

18. Apparatus for providing a service to notify the occurrence of an area-based event in a wireless network according to claim 12, wherein:

said given target area is defined by X and Y coordinates.

19. Apparatus for providing a service to notify the occurrence of an area-based event in a wireless network according to claim 12, wherein:

said given target area is defined by at least one zip code.

20. Apparatus for providing a service to notify the occurrence of an area-based event in a wireless network according to claim 12, wherein:

said target area event includes a time range for activation.

21. Apparatus for providing a service to notify the occurrence of an area-based event in a wireless network according to claim 12, wherein:

said given target area is defined by at least one geographic boundary.

22. Apparatus for providing a service to notify the occurrence of an area-based event in a wireless network according to claim 12, wherein said given target area event comprises:

at least one geographic parameter associated with at least one time-based parameter.

\* \* \* \* \*